United States Patent [19]
Hill, Jr.

[11] Patent Number: 5,815,977
[45] Date of Patent: Oct. 6, 1998

[54] FISHING EQUIPMENT LANYARD

[76] Inventor: Larry W. Hill, Jr., 10766 Waters Rd., Hereford, Ariz. 85615

[21] Appl. No.: 762,879

[22] Filed: Dec. 12, 1996

[51] Int. Cl.$^6$ .................................................. A01K 87/00
[52] U.S. Cl. .................................................. 43/25
[58] Field of Search ........................... 43/25, 4; 119/769, 119/770, 792, 795, 793

[56] References Cited

U.S. PATENT DOCUMENTS

| | | | |
|---|---|---|---|
| 2,994,300 | 7/1961 | Grahling | 119/96 |
| 4,998,507 | 3/1991 | Browning | 119/109 |
| 5,324,220 | 6/1994 | Stewart | 441/75 |
| 5,511,293 | 4/1996 | Hubbard | 24/442 |

Primary Examiner—Joseph J. Hail, III

[57] ABSTRACT

A fish equipment lanyard for preventing loss of fishing equipment rod and reel assemblies by tethering the equipment to the user thereof. The fishing equipment lanyard comprising cord which has a first end with a first connector ring fixedly attached thereto. The cord also has a second end with a second connector ring fixedly attached thereto. A semi-circular third connector ring is attached to the first connector ring and further a fourth connector ring of a wrist strap thereby fixedly attaching the first end of the cord to the wrist strap. A snap shackle has a fifth connector ring swivedly connected to a sixth connector ring which, in turn, is connected to the second connector ring, whereby the fishing rod and reel may be snappily connected to the cord.

1 Claim, 3 Drawing Sheets

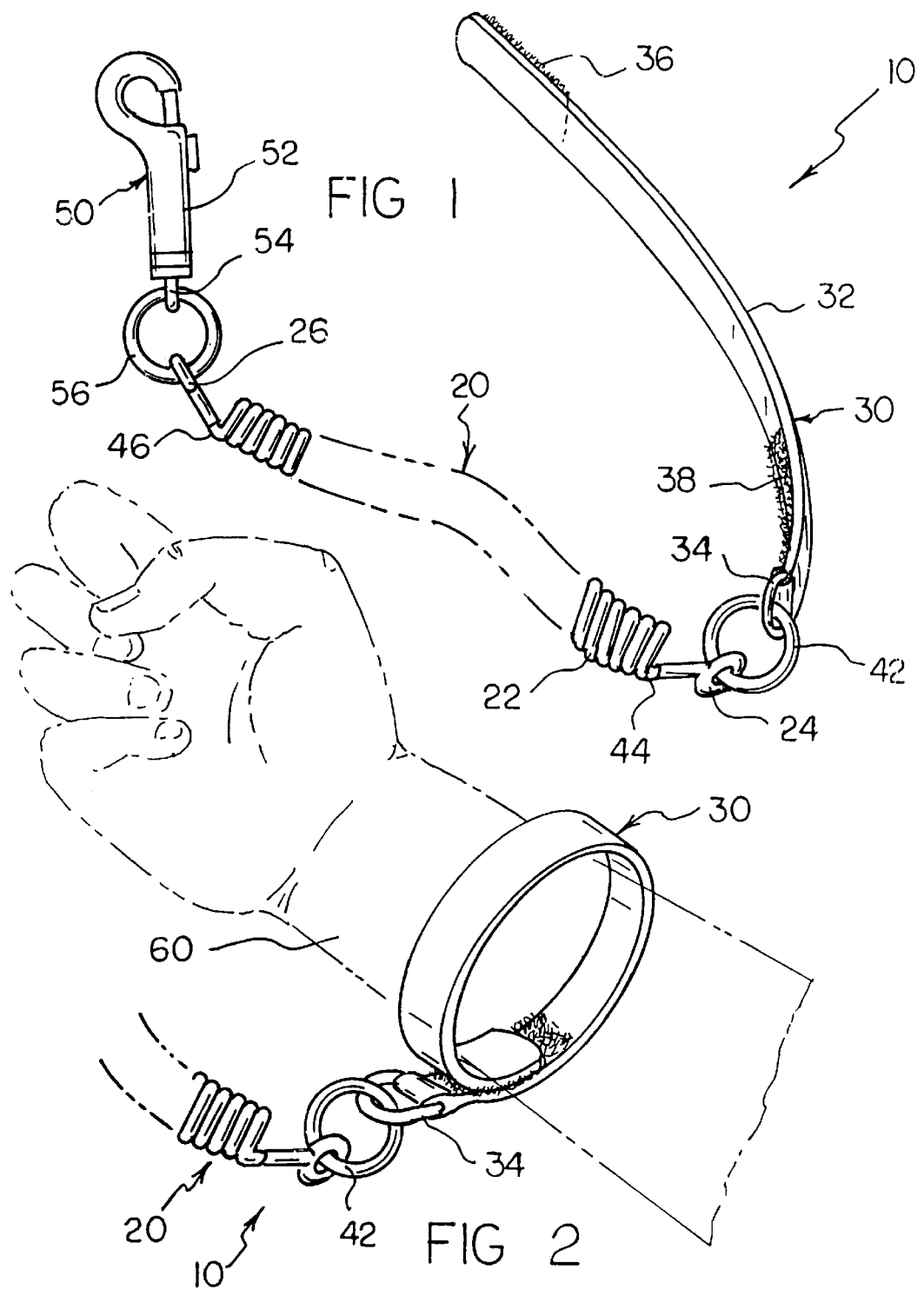

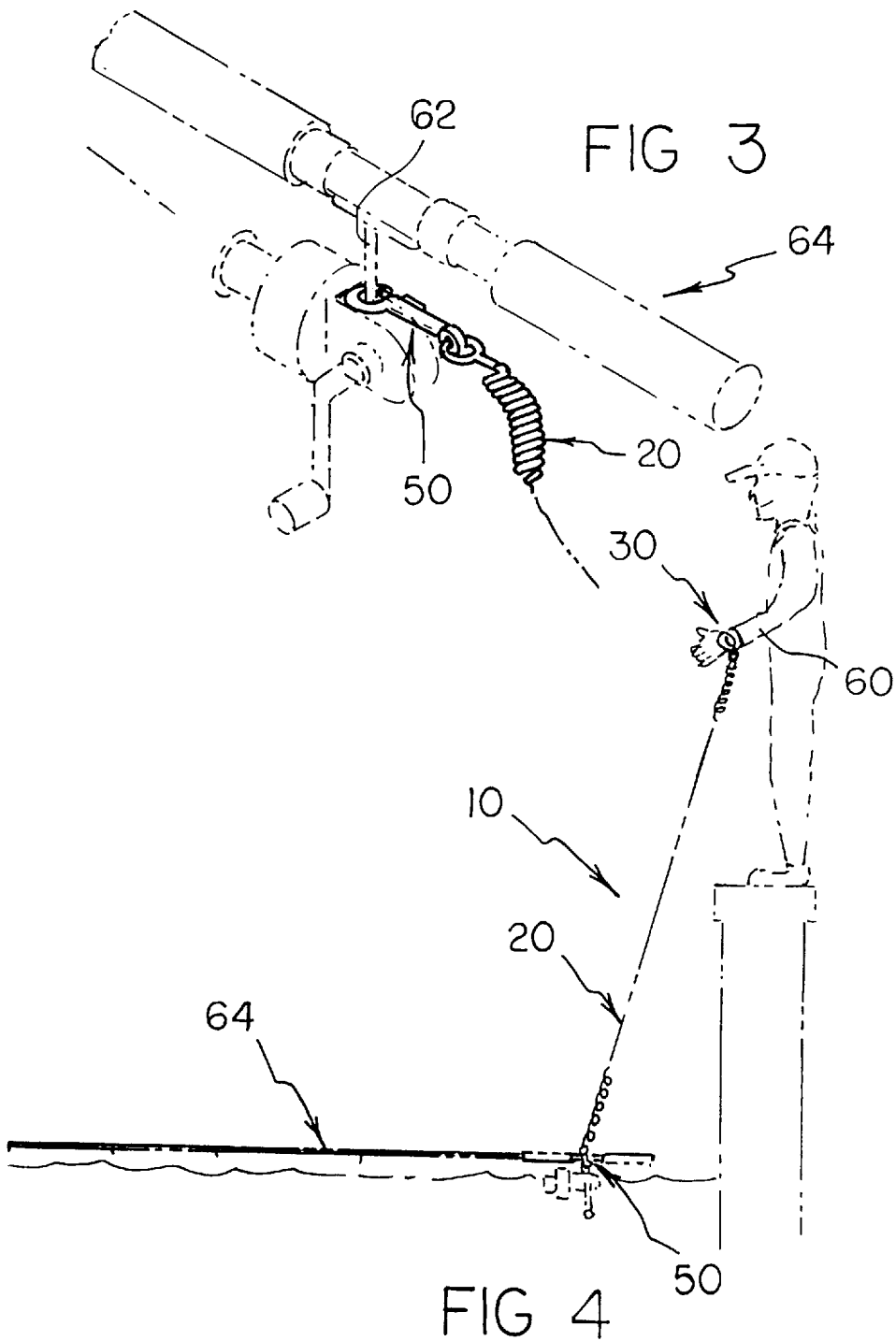

FISHING EQUIPMENT LANYARD

BACKGROUND OF THE INVENTION

1. Field of the Invention

The present invention relates to safety cords for portable equipment and more particularly pertains to fishing equipment lanyards which may be adapted for preventing loss of fishing equipment rod and reel assemblies by tethering the equipment to the user with a retractile lanyard.

2. Description of the Prior Art

The use of safety cords for portable equipment is known in the prior art. More specifically, safety cords for portable equipment heretofore devised and utilized for the purpose of preventing loss of equipment are known to consist basically of familiar, expected and obvious structural configurations, notwithstanding the myriad of designs encompassed by the crowded prior art which have been developed for the fulfillment of countless objectives and requirements.

The present invention is directed to improving devices for preventing loss of fishing equipment rod and reel assemblies by tethering the equipment to the user with a retractile lanyard in a manner which is safe, secure, economical and aesthetically pleasing.

For example, U.S. Pat. No. 4,290,159 to McLennan et al. discloses a sportsman's retriever mountable on a fishing rod, rifle or the like, for aiding to retrieve the same, if dropped into deep water; the device including, generally, a canister containing a line wound up around a spool, one end of the line attached to the spool, and the other end of the line being attached to an exterior float, adhered by a water-soluble adhesive to the canister, and a bracket, or other means, for securing the canister to the sportsman's equipment.

U.S. Pat. No. 5,156,562 to Pearson et al. describes a submerged article marker and retriever mountable on a fishing rod, hand tool, or other article to be used near water, for marking and retrieving the submerged article should the article be dropped into water; the marker-retriever including, generally, a housing comprising a fixed housing member, a releasable housing member, and a wrapper partially enclosing the housing members to maintain cooperation therebetween, attaching means for securing the housing to the article, a buoy disposed within the housing, release means for releasing the buoy from the housing when the article is submerged, and a line connecting the buoy to the attaching means.

The prior art also discloses a fishing equipment anchor as shown in U.S. Pat. No. 5,160,257 to Tsengas which consists of a fishing rod and reel assembly having an anchor for securing the assembly against loss. The anchor comprises an anchor body attached to the rod and reel and connecting structure detachable connected to the body. The body comprises a body portion extending between the reel and the rod, body portion movement limiting structure for engaging the rod and reel to prevent separation of the anchor body from the assembly, and end structure detachably connected to the connecting structure. The connecting structure comprises a tether having quick disconnecting spring clip connectors at its ends.

Other patents of interest include U.S. Pat. No. 5,012,607 to Meschkat which describes an add-on trigger with safety fastener for fishing rod reel, and U.S. Pat. No. 5,088,224 to Gutierrez which discloses a fishing rod holder and stand.

While these devices fulfill their respective, particular objectives and requirements, the aforementioned patents do not disclose a fishing equipment lanyard for preventing loss of fishing equipment rod and reel assemblies by tethering the equipment to the user with a retractile lanyard. Furthermore, none of the prior art devices teach or suggest a tethering method that connects to the equipment with a removable connector means.

In this respect, the fishing equipment lanyard according to the present invention substantially departs from the conventional concepts and designs of the prior art, and in so doing provides an apparatus primarily developed for the purpose of preventing loss of fishing equipment rod and reel assemblies by tethering the equipment to the user with a retractile lanyard.

Therefore, it can be appreciated that there exists a continuing need for new and improved fishing equipment lanyards which can be used for preventing loss of fishing equipment rod and reel assemblies by tethering the equipment to the user with a retractile lanyard. In this regard, the present invention substantially fulfills this need.

As illustrated by the background art, efforts are continuously being made in an attempt to develop devices for preventing loss of equipment. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of safety cords for portable equipment now present in the prior art, the present invention provides an improved safety cord for portable equipment construction wherein the same can be utilized for preventing loss of fishing equipment rod and reel assemblies by tethering the equipment to the user with a retractile lanyard. As such, the general purpose of the present invention, which will be described subsequently in greater detail, is to provide a new and improved fishing equipment lanyard apparatus and method which has all the advantages of the prior art safety cords for portable equipment and none of the disadvantages.

The invention is defined by the appended claims with the specific embodiment shown in the attached drawings. For the purpose of summarizing the invention, the invention may be incorporated into a new and improved fishing equipment lanyard for preventing loss of fishing equipment rod and reel assemblies by tethering the equipment to the user with a retractile lanyard. The fishing equipment lanyard comprises a retractile coil cord formed of waterproof material. The coil cord has an extended length substantially greater than its retracted length. The coil cord also has a first end with a connector ring fixedly attached thereto and a second end with a connector ring fixedly attached thereto. The new fishing equipment lanyard also includes a wrist strap formed of flexible waterproof material with a connector ring fixedly attached to one end. The wrist strap also has uncut nylon pile disposed along an end portion of one side thereof and nylon hook material disposed along the opposite end portion of the other side such that the strap may be wrapped around a user's wrist with the nylon hook and pile material cooperatively hookedly engaging with each other to form a removable adjustable means to secure the strap snugly around the user's wrist.

The fishing equipment lanyard further includes a first connector ring extending through the connector ring of the first end of the retractile coil cord. The first connector ring also extends through the connector ring of the wrist strap whereby fixedly attaching the first end of the retractile coil cord to the wrist strap. A snap shackle whereto the fishing rod and reel equipment may be snapidly removedly connected has a connector ring swiveledly connected thereto. Additionally, a second connector ring, extending through the connector ring of the second end of the retractile coil cord, is included. The second connector ring also extends through the connector ring of the snap shackle whereby the snap shackle is swiveledly connected to the second end of the retractile coil cord.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an fishing equipment lanyard for preventing loss of fishing equipment rod and reel assemblies by tethering the equipment to the user with a retractile lanyard.

It is therefore an additional object of the present invention to provide a new and improved fishing equipment lanyard which has all the advantages of the prior art safety cords for portable equipment and none of the disadvantages.

It is another object of the present invention to provide a new and improved fishing equipment lanyard which may be easily and efficiently manufactured and marketed.

It is a further object of the present invention to provide a new and improved fishing equipment lanyard which is of a durable and reliable construction.

An even further object of the present invention is to provide a new and improved fishing equipment lanyard which is susceptible of a low cost of manufacture with regard to both materials and labor, and which accordingly is then susceptible of low prices of sale to the consuming public, thereby making such fishing equipment lanyards economically available to the buying public.

Still yet another object of the present invention is to provide a new and improved fishing equipment lanyard which provides in the apparatuses and methods of the prior art some of the advantages thereof, while simultaneously overcoming some of the disadvantages normally associated therewith.

Still yet another object of the present invention is to provide a new and improved fishing equipment lanyard that, during normal operation, automatically retracts to a short length making it unobtrusive and convenient to use.

Yet another object of the present invention is to provide a new and improved fishing equipment lanyard that is adapted to work without modification with a wide variety of rod and reel assemblies and a large range of child-to-adult wrist sizes.

Even still another object of the present invention is to provide a new and improved fishing equipment lanyard that protects the user from injury due to being struck by a fishing rod and reel assembly that is unexpectedly violently jerked from his grasp by allowing the fishing equipment to fall a distance away from the user's body before being stopped by the tethering action of the lanyard.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the new fishing equipment lanyard.

FIG. 2 is a partial perspective view of the invention of FIG. 1 showing its method of attachment to a user's wrist.

FIG. 3 is a partial perspective view of the invention of FIG. 1 showing a method of attachment to a fishing rod and reel assembly.

FIG. 4 is a side elevational view of the new fishing equipment lanyard illustrating its method of operation.

DESCRIPTION OF THE PREFERRED EMBODIMENT

Figure 5:
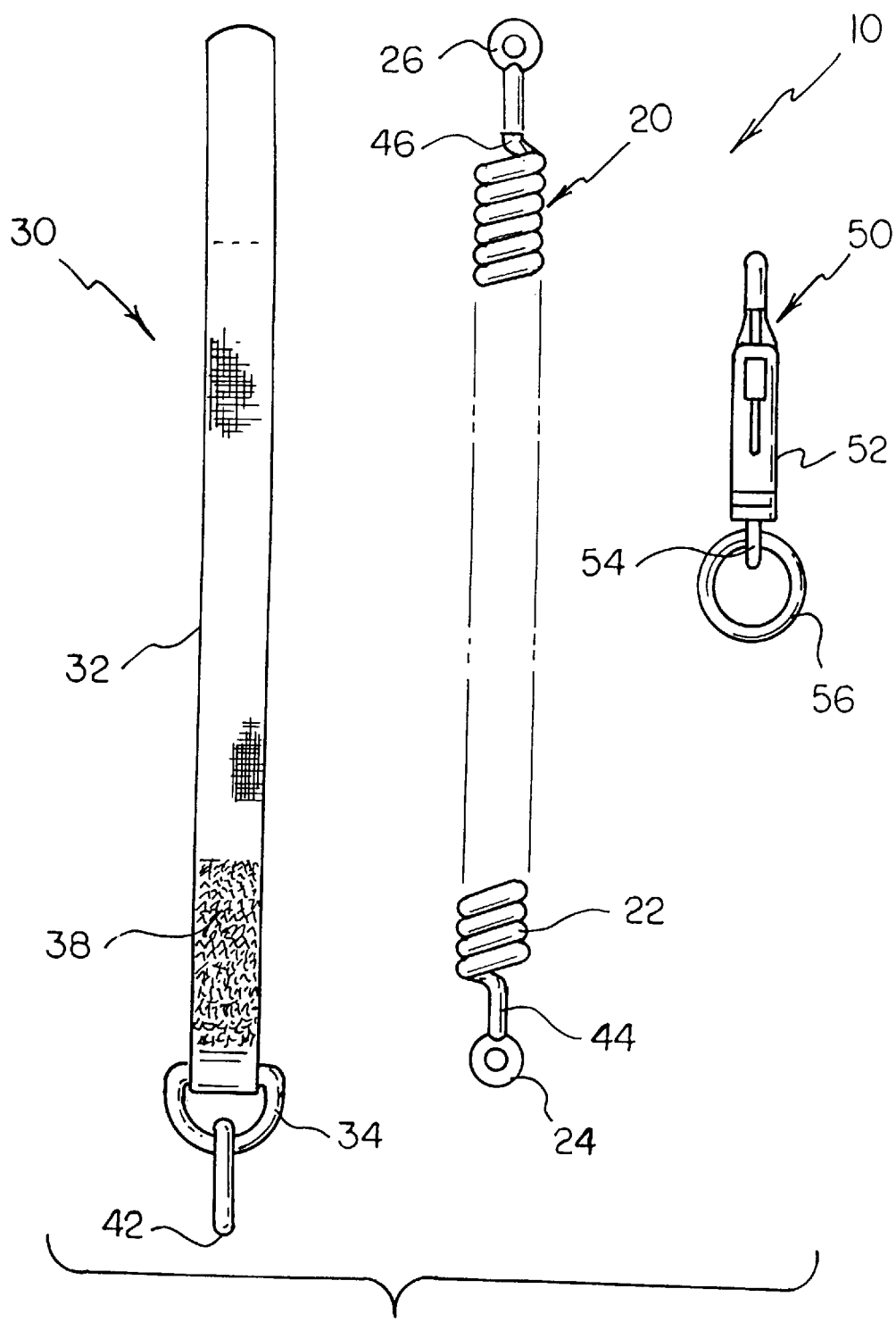
FIG. 5 is an exploded view of the present invention showing its component parts.

With reference now to the drawings, and in particular to FIG. 1 thereof, a new and improved fishing equipment lanyard embodying the principles and concepts of the present invention and generally designated by the reference numeral 10 will be described.

From an overview standpoint, the fishing equipment lanyard is adapted for use for preventing loss of fishing equipment rod and reel assemblies by tethering the equipment to the user with a retractile lanyard. See FIG. 4.

With reference now to FIGS. 1–5 and more specifically, it will be noted that a new and improved fishing equipment lanyard 10 for preventing loss of fishing equipment rod and reel assemblies 64 by tethering the equipment to the user with a retractile lanyard 20 is shown. The fishing equipment lanyard 10 comprises a retractile coil cord 22 formed of waterproof material. The coil cord 22 has an extended length substantially greater than its retracted length.

The coil cord 22 also has a first end 44 with a connector ring 24 fixedly attached thereto and a second end 46 with a connector ring 26 fixedly attached thereto. The new fishing equipment lanyard 10 also includes a wrist strap 30 formed of flexible waterproof material with a connector ring 34 fixedly attached to one end.

The wrist strap 30 also has uncut nylon pile material 38 disposed along an end portion of one side thereof and nylon hook material 36 disposed along the opposite end portion of the other side such that the strap 30 may be wrapped around a user's wrist 60 with the nylon hook and pile material 36 and 38 cooperatively hookedly engaging with each other to form a removable adjustable means to secure the strap 30 snugly around the user's wrist 60.

The fishing equipment lanyard 10 further includes a first connector ring 42 extending through the connector ring 24 of the first end of the retractile coil cord. The first connector ring 42 also extends through the connector ring of the wrist strap 34 whereby fixedly attaching the first end of the retractile coil cord 44 to the wrist strap 30.

A snap shackle 50, whereto the fishing rod and reel equipment 64 may be snapidly removedly connected, has a connector ring 54 swiveledly connected thereto. Additionally, a second connector ring 56, extending through the connector ring 26 of the second end 46 of the retractile coil cord 22, is included. The second connector ring 56 also extends through the connector ring 54 of the snap shackle 50 whereby the snap shackle 50 is swiveledly connected to the second end 46 of the retractile coil cord 22.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A fishing equipment lanyard system for preventing a loss of fishing equipment rod and reel assemblies by tethering the equipment to the user thereof, the fishing equipment lanyard comprising:

a fishing rod and reel assembly;

a cord having a first end with a first connector ring fixedly attached thereto, the cord also having a second end with a second connector ring fixedly attached thereto, the cord further comprising a retractile coil cord having an extended length and being formed of waterproof material;

a semi-circular third connector ring having an end of a wrist strap attached thereto, a fourth connector ring extending through the first connector ring attached to the first end of the cord, the fourth connector ring also extending through the semi-circular third connector ring attached to the wrist strap, thereby fixedly attaching the first end of the cord to the wrist strap;

the wrist strap also includes securement means for securing the wrist strap around a wrist of a user, the securement means comprises uncut nylon pile disposed along an end portion of a first side of the wrist strap and nylon hook material disposed along another end portion of a second side of the wrist strap for removably engaging the end portion of the first side of the wrist strap when the strap is wrapped around the wrist of the user;

a snap shackle having a fifth connector ring swiveledly connected thereto, the snap shackle being snappily coupled to a mounting post of a reel of the fishing rod and reel assembly; and a sixth connector ring extending through the second connector ring of the second end of the cord, the sixth connector ring also extending through the fifth connector ring of the snap shackle, whereby the snap shackle is swiveledly connected to the second end of the cord.

* * * * *